(12) United States Patent
Chahrouri et al.

(10) Patent No.: US 7,657,263 B1
(45) Date of Patent: Feb. 2, 2010

(54) METHOD AND SYSTEM FOR AUTOMATIC CALL DISTRIBUTION BASED ON CUSTOMIZED LOGIC RELATING TO AGENT BEHAVIOR

(75) Inventors: Gebran G. Chahrouri, Menlo Park, CA (US); Kevin T. Collins, Roseville, CA (US); Labhesh Patel, Mountain View, CA (US); Chris S. L. Yeo, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 1192 days.

(21) Appl. No.: 10/104,564

(22) Filed: Mar. 21, 2002

(51) Int. Cl.
*H04L 29/06* (2006.01)
*H04M 5/00* (2006.01)

(52) U.S. Cl. ............. 455/445; 379/265.05; 379/265.06; 379/265.1; 379/269; 379/309; 455/453

(58) Field of Classification Search ................. 379/265, 379/266, 269, 309; 455/435
See application file for complete search history.

(56) References Cited

U.S. PATENT DOCUMENTS

| | | | | |
|---|---|---|---|---|
| 4,747,130 A | * | 5/1988 | Ho | 379/269 |
| 5,894,512 A | | 4/1999 | Zenner | 379/265 |
| 5,903,641 A | * | 5/1999 | Tonisson | 379/265.12 |
| 5,987,115 A | | 11/1999 | Petrunka et al. | 379/265 |
| 5,999,965 A | | 12/1999 | Kelly | 709/202 |
| 6,005,932 A | | 12/1999 | Bloom | 379/265 |
| 6,404,747 B1 | | 6/2002 | Berry et al. | 370/270 |
| 6,408,066 B1 | | 6/2002 | Andruska et al. | 379/265.12 |
| 6,665,537 B1 | | 12/2003 | Lioy | 455/435 |
| 6,845,154 B1 | * | 1/2005 | Cave et al. | 379/265.02 |

OTHER PUBLICATIONS

MSN Encarta Dictionary, http://encarta.msn.com/dictionary_/workflow.html.*

* cited by examiner

*Primary Examiner*—Nick Corsaro
*Assistant Examiner*—Amanuel Lebassi
(74) *Attorney, Agent, or Firm*—Baker Botts L.L.P.

(57) ABSTRACT

A method of routing calls of an automatic call distributor system that includes receiving a first workflow, comprising a desired behavior, associated with a first agent of a plurality of agents and receiving at least one request from a respective user for connection with one of the agents. The method also includes monitoring system information and executing the first workflow after the first agent becomes available for connection with one of the requests. The method includes selecting a first request of the at least one request, wherein the first request is selected based on the first agent's desired behavior and the monitored system information, and connecting the first request to the first agent. The method may also include receiving a notification that the first agent is available for connection with one of the respective users, and executing the first workflow after receiving the notification that the first agent is available.

33 Claims, 2 Drawing Sheets

METHOD AND SYSTEM FOR AUTOMATIC CALL DISTRIBUTION BASED ON CUSTOMIZED LOGIC RELATING TO AGENT BEHAVIOR

TECHNICAL FIELD OF THE INVENTION

The present invention relates generally to automated network communication distribution and more particularly, to a method and system for automatic call distribution based on customized logic relating to agent behavior.

BACKGROUND OF THE INVENTION

Automatic call distributors (ACDs) are specialized systems designed to match incoming requests for service, for example a telephone call or an e-mail, with a resource that is able to provide that service, for example a human contact center agent. ACDs generally perform one or more of the following functions: (i) recognize and answer incoming calls; (ii) review database(s) for instructions on what to do with a particular call; (iii) using these instructions, identify an appropriate agent and queue the call, often times providing a prerecorded message; and (iv) connect the call to an agent as soon as the agent is available.

The term automatic call distributor comes from distributing the incoming calls in a logical pattern to a group of agents. That pattern may be uniform (to distribute the work uniformly), or it may be top-down (the same agents in the same order get the calls and are kept busy, the ones on the top typically being kept busier than the ones on the bottom), or it may be specialty routing, where calls are routed to agents who are most likely able to help the caller the most. ACDs typically offer a varying degree of customization to system configuration that enable the manager of the ACD system to control how calls are allocated to agents.

Skill-based routing is an ACD feature that provides for the selection of an appropriate agent for handling a particular call. With this feature, agents are registered with their skills set as resources for handling calls. The caller may indicate the skill that she requires for a particular transaction, and the system may either find the appropriate resource or queue the caller until the resource with the requested skill becomes available.

SUMMARY OF THE INVENTION

The present invention provides a method and system for automatic call distribution based on customized logic relating to agent behavior that substantially eliminates or reduces at least some of the disadvantages and problems associated with previous methods and systems for automatic call distribution.

In accordance with a particular embodiment of the present invention a method for routing calls of an automatic call distributor system includes receiving a first workflow associated with a first agent of a plurality of agents. The first workflow comprises a desired behavior for the first agent. The method includes receiving at least one request for connection with one of the plurality of agents, wherein each request is received from a respective user. The method also includes monitoring system information and executing the first workflow after the first agent becomes available for connection with one of the respective users. The method includes selecting a first request of the at least one request, wherein the first request is selected based on the desired behavior of the first agent and the monitored system information, and connecting the first request to the first agent. The method may also include receiving a notification that the first agent is available for connection with one of the respective users, and executing the first workflow after the first agent becomes available for connection with one of the respective users may comprise executing the first workflow after the notification that the first agent is available for connection with one of the respective users is received.

In accordance with another embodiment, an automatic call distributor system comprises a memory operable to receive a first workflow associated with a first agent of a plurality of agents. The first workflow comprises a desired behavior for the first agent. The system includes at least one input port, wherein each input port is operable to receive a request for connection with one of the plurality of agents and wherein each request is received from a respective user. The system includes an observer operable to monitor system information. The processor may be further operable to execute the first workflow after the first agent becomes available for connection with one of the respective users. The processor may be further operable to select a first request of the at least one request, wherein the first request is selected based on the desired behavior of the first agent and the monitored system information. The system also includes a distributor operable to connect the first request to the first agent. The processor may be further operable to receive a notification that the first agent is available for connection with one of the respective users. The processor being further operable to execute the first workflow after the first agent becomes available for connection with one of the respective users may comprise the processor being further operable to execute the first workflow after the notification that the first agent is available for connection with one of the respective users is received by the processor.

Technical advantages of particular embodiments of the present invention include a system and method that allows customized logic to be entered relating to desired behavior of a particular agent or group of agents. Accordingly, the particular agent or group of agents may be connected to particular calls or requests for service based on the desired behavior of such agents, thus providing a manager of an ACD greater control and flexibility over the connection of calls and agent behavior.

Another technical advantage of particular embodiments of the present invention includes a system and method that executes customized logic relating to agent behavior when an agent or group of agents becomes available to receive a call. The customized logic may access various system statistics in real-time and provide different behavior based on the state of the system when a particular agent is available to handle a call. Accordingly, the types of agent behavior and actions that may be controlled may be different from such behavior and actions controlled in some traditional ACD systems and methods.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following descriptions, taken in conjunction with the accompanying drawings, in which.

DETAILED DESCRIPTION OF THE INVENTION

Figure 1:
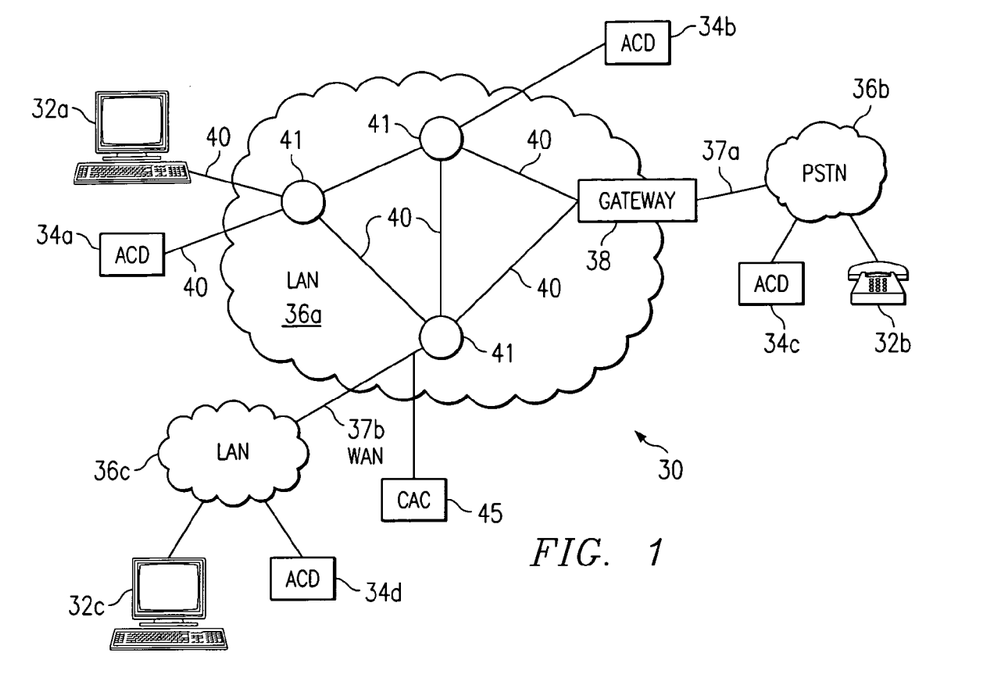
FIG. 1 illustrates a communication system including a plurality of endpoints operable to communicate among each other and a plurality of automatic call distributors (ACDs), in accordance with a particular embodiment of the present invention.

FIG. 1 illustrates a communication system 30 including a plurality of endpoints 32a-32c having the ability to establish communication sessions between each other and/or automatic call distributors (ACDs) 34a-34d, using one or more of communication networks 36a-36c. ACDs are specialized communication systems designed to route incoming calls to available agents, so that calls are properly and/or evenly distributed. For the purposes of this specification, "ACD" shall refer to any combination of hardware, software and/or embedded logic which is operable to automatically distribute incoming calls, and "calls" shall include requests for service transmitted using any audio and/or video means, including signals, data or messages transmitted through voice devices, text chat, web sessions, facsimile, and e-mail.

In the illustrated embodiment, incoming calls are routed to an ACD of a communication system. The calls are connected to agents able to service the ACD. The teachings of the present invention provide a system and method for connecting agents to such calls based upon desired behavior for a particular agent or group of agents. The desired behavior can be entered into the communication system by a system manager through workflows containing customized logic and can be executed by the system when an agent becomes available to handle a call. The ability of the system to receive and execute customized logic affecting agent behavior when the agent or group of agents becomes available provides a system manager greater flexibility and control over the calls a particular agent or group of agents receive and the behavior of such agents.

In the illustrated embodiment, communication network 36a is a local area network (LAN) that enables communication between a plurality of endpoints 32a-32c and ACDs 34a-34d distributed across multiple cities and geographic regions. In another embodiment, a single, central ACD may be used, which distributes incoming calls to agents distributed across multiple cities and geographic regions. Communication network 36b is a public switched telephone network (PSTN) and couples endpoint 32b and ACD 34c with communication network 36a through gateway 38. Communication network 36c is another LAN, which couples endpoint 32c and ACD 34d with communication network 36a. Accordingly, users of endpoints 32a-32c and ACDs 34a-34d can establish communication sessions between and among each network component coupled for communication with one or more of networks 36a-36c. Communication links 37a and 37b couple communication networks 36a and 36b, and communication networks 36a and 36c, respectively. In the illustrated embodiment, communication link 37b is a wide area network (WAN), which couples LANs 36a and 36c. A call admission control (CAC) system 45 may be used to monitor the amount of bandwidth available over WAN 37b.

Communication network 36a includes a plurality of segments 40 and nodes 41 that couple endpoint 32a with ACDs 34a and 34b, gateway 38, and communication networks 36b-36c. Therefore, a user of endpoint 32a is provided with access to endpoints 32b and 32c, and ACDs 34a-34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a-36c, the term "communication network" should be interpreted as generally defining any network capable of transmitting audio and/or video telecommunication signals, data, and/or messages, including signals, data or messages transmitted through text chat and e-mail. Any one of networks 36a-36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a-32c. Communication network 36a may include any number and combination of segments 40, nodes 41, endpoints 32a-32c, and/or ACDs 34a-34d.

In a particular embodiment, communication network 36a employs voice communication protocols that allow for the addressing or identification of endpoints, nodes, and/or ACDs coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36b through gateway 38. PSTN 36b includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36b), a dedicated circuit is not required for the duration of a call or fax transmission over IP networks.

Technology that allows telecommunications to be transmitted over an IP network may comprise Voice over IP (VoIP), or simply Voice over Packet (VoP). In the illustrated embodiment, endpoint 32a, ACDs 34a-34b, and gateway 38 are IP telephony devices. IP telephony devices have the ability of encapsulating a user's voice (or other input) into IP packets so that the voice can be transmitted over network 36a. IP telephony devices may include telephones, fax machines, computers running telephony software, nodes, gateways, or any other device capable of performing telephony functions over an IP network.

It will be recognized by those of ordinary skill in the art that endpoints 32a-32c, ACDs 34a-34d, and/or gateway 38 may be any combination of hardware, software, and/or encoded logic that provides communication services to a user. For example, endpoints 32a-32c may include a telephone, a computer running telephony software, a video monitor, a camera, or any other communication hardware, software, and/or encoded logic that supports the communication of packets of media (or frames) using communication network 36a. Endpoints 32a-32c may also include unattended or automated systems, gateways, other intermediate components, or other devices that can establish media sessions. Although FIG. 1 illustrates a particular number and configuration of endpoints, ACDs, segments, nodes, and gateways, communication system 30 contemplates any number or arrangement of such components for communicating media.

Figure 2:
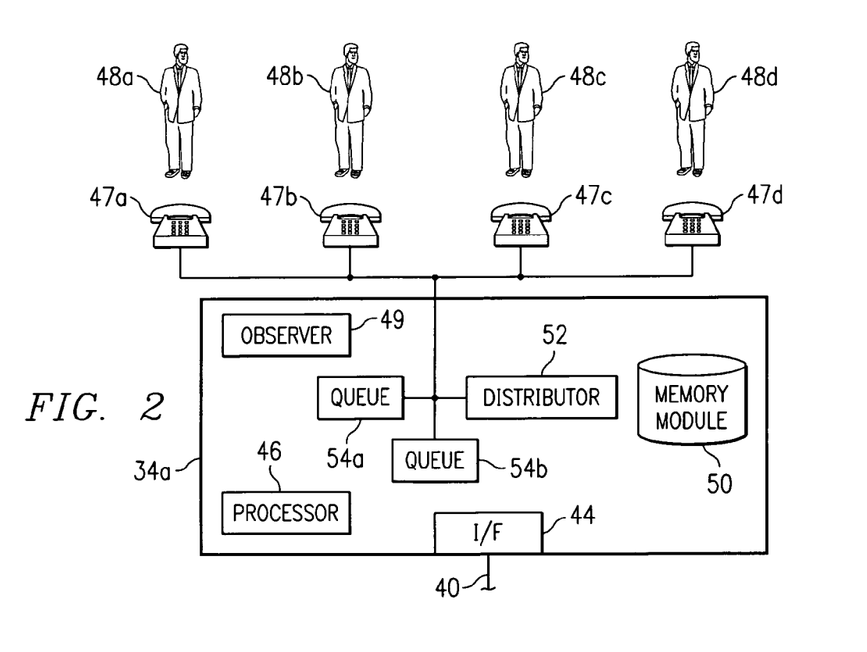
FIG. 2 illustrates an ACD of FIG. 1 in more detail, illustrating aspects of the present invention.

FIG. 2 illustrates ACD 34a in more detail, in accordance with a particular embodiment of the present invention. ACD 34a includes an interface 44 which couples ACD 34a with communication network 36a, using segment 40. When a call is received at ACD 34a, a processor 46 and observer 49 are used to determine which of a plurality of agents 48a-48d should receive the call using endpoints 47a-47d, respectively. In doing so, processor 46 may use observer 49, a memory lookup, a database, or other memory module, such as memory module 50. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component. Observer 49 may be any combination of hardware, software and/or encoded logic, and is used to monitor conditions of ACD 34a, such as the number, type or characteristics of calls in queues 54 or the "state" of each agent (e.g., logged in, available, unavailable, etc.). It will be recognized by those of ordinary skill in the art that ACD 34a may include any number of processors or memory modules to accomplish the functionality and features described herein. The processors 46, memory modules 50, and/or observer 49 associated with ACD 34a may be centrally located (local) with respect to one another, or distributed throughout communication network 36a.

If a suitable agent is available to receive the incoming call, a distributor 52 of ACD 34a connects the call with such agent. Such connection may comprise, for example, coupling a sender of the call with the suitable agent if the call comprises a voice call or transmitting the call to the suitable agent if the call comprises, for example, an e-mail. If a suitable agent is not available, the call may be placed into a queue 54 in order to wait for an appropriate agent(s). In this embodiment, ACD 34a has two queues 54; however other embodiments of the present invention may have none, one or more than two queues 54. The selection of which queue 54 to place an incoming call may depend on the type of customer making the call, the type of service requested in the call or any other characteristic or condition relating to the call or ACD 34a. While a caller is waiting for an agent, ACD 34a may perform one or more of several functions including data collection from the user, playing of pre-recorded messages, or other automated process. As soon as a suitable agent becomes available, distributor 52 connects the call with the appropriate agent.

In a particular embodiment of the present invention, ACD 34a is configured to receive customized logic affecting the manner in which agents are connected to calls. The logic may be entered by a system manager through a network component, such as a computer, and received at interface 44. The logic may be entered before or after an agent or a group of agents becomes available to handle a call. The logic may be specific to a particular agent or group of agents. The logic may be written in a workflow and entered into memory 50. The logic is then be executed by ACD 34a after a particular agent or group of agents becomes available to handle a call. Executing customized logic specific to a particular agent at the time the agent becomes available to handle a call provides a manager of ACD 34a greater flexibility and control over agent behavior.

For example, assume that agents 48a and 48b normally take calls from both queues 54a and 54b. Assume also that multiple calls have been received and some have been placed in queue 54a and some have been placed in queue 54b. A system manager may desire for agent 48a to always handle calls from queue 54a, if any exist, and only handle calls from queue 54b if queue 54a is empty. A system manager of ACD 34a may input into ACD 34a a workflow containing relating to the desired behavior for agent 48a. When agent 48a becomes available processor 46 executes the workflow previously entered relating to agent 48a. Agent 48a may become available after concluding a previous call, after taking a break or after other occurrences. For example, an agent may become available after transmitting a message in the middle of a call with another customer where the data or messages of the call are communicated asynchronously, such as through web e-mail or text chat. Observer 49 may also check conditions of ACD 34a, such as the quantity and/or characteristics of calls waiting in queues 54. After executing the workflow and checking conditions of ACD 34a, ACD 34a routes a particular call to agent 48a based upon the workflow and the conditions. In this example, distributor 52 would connect agent 48a to a call from queue 54a since queue 54a contained calls at that time. This connection is in accordance with the desire of the system manager who input the desired behavior of agent 48a into ACD 34a through the workflow.

Assume further that the desired behavior for agent 48b involves simply handling the call that has waited the longest on either of queues 54a and 54b. A system manager of ACD 34a may input into ACD 34a a workflow relating to the desired behavior for agent 48b. When agent 48b becomes available, observer 49 may also check conditions of ACD 34a and observe the amount of time each call currently contained in queues 54a and 54b had been waiting. Processor 46 executes the workflow previously entered relating to agent 48b. After executing the workflow and observing conditions of ACD 34a, distributor 52 connects the particular call residing in queue 54a or 54b which had been waiting the longest amount of time to agent 48b.

As another example, a system manager may desire for a particular agent, for example agent 48c, to only be connected to calls from customers of a particular level or type, such as a platinum, or high, level. In this case, the system manager would enter a workflow containing logic dictating such behavior for agent 48c into memory 50. Once agent 48c became available to be connected to a call, processor 46 would execute the workflow, and distributor 52 would connect agent 48c to a call from a customer from the level in the workflow. Such a customer would be determined when observer 49 checked or monitored conditions of ACD 34a, such as the types of customers making the calls that existed in queues 54.

A system manager may enter workflows relating to a wide variety of agent behavior. One of ordinary skill in the art could identify numerous types of behavior of agents which a system manager may desire in addition to the examples discussed above. For example, it may be desired that some agents only be connected to calls from customers with certain preferences. The preference of a customer may be determined in any of a variety of ways, such as: (i) using caller ID in order to determine the source of the incoming call, (ii) by selection of the caller using touch-tone prompts or other data entry techniques, (iii) according to a user profile stored within a memory module coupled with ACD 34a or (iv) according to an identification number associated with the caller.

Other ways a system manager may control agent behavior after an agent becomes available to handle a call may include connecting an agent to certain types of calls based on the agent's performance. For example, a system manager may enter a workflow that, when executed (at the time an agent becomes available), only allows the agent to handle calls of a lower priority when the agent has not met certain performance standards over the more recent calls handled by the agent. The workflow would be executed each time the agent becomes available for a call, as described above. When the agent's performance level over recent calls increases to a more acceptable level, the workflow might then allow the agent to handle calls of higher priority. This kind of control over agent behavior can be achieved dynamically over the course of multiple calls taken by the agent.

Other conditions upon which a workflow relating to agent behavior may be based may include conditions relating to a particular time of day or day of week. For example, the types of calls certain agents are connected to may change depending on whether the agent is working a daytime shift or an off-hour shift. A particular agent or group of agents may be subject to more stringent parameters, and a system manager may desire greater control over such agents' behavior, during a day shift when call volumes are high. In some embodiments, a workflow may require that an agent not be connected to currently queued calls even though the agent is available to receive a call, and the workflow may require the agent to wait until a particular type of call is received for connection.

The customized logic included in the workflows may direct the ACD to perform virtually any action the system manager desires while the system is in the process of connecting an agent to a particular call. For example, the system manager may leverage the multimedia capabilities of the ACD to send an e-mail, page or fax or place an outbound telephone call at such time. As discussed above, the workflows can access various system statistics in real-time and provide different behavior based on the state of the system (for example, number of calls in a queue, number of agents available, time of day, day of week).

Figure 3:
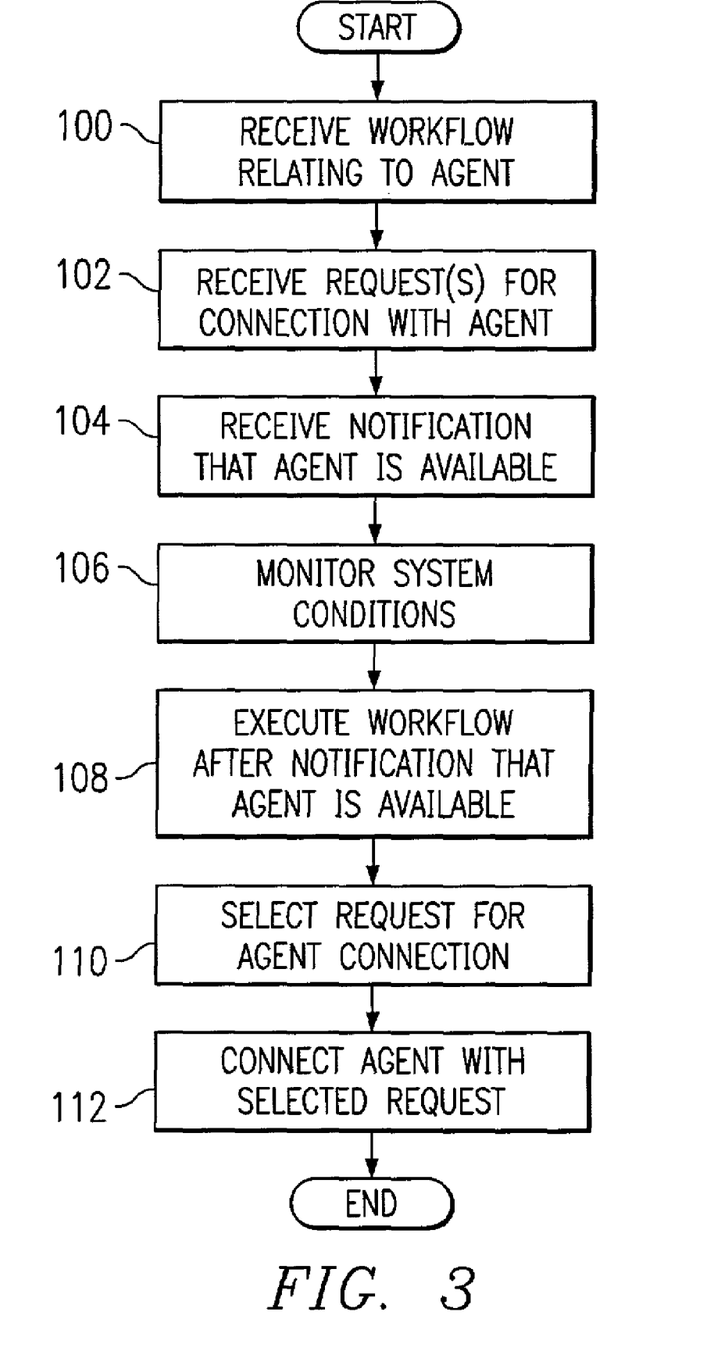
FIG. 3 illustrates a method for automatic call distribution, in accordance with another embodiment of the present invention.

FIG. 3 illustrates a method for routing calls of an automatic call distributor system, in accordance with a particular embodiment of the present invention. The method begins at step 100 where a workflow is received relating to an agent. The workflow may be received from a system manager, such as a system manager of an ACD. In particular embodiments, such receipt may comprise the workflow being loaded onto disk by a system manager or loaded into RAM by the ACD system. The workflow comprises desired behavior for the agent. Such desired behavior may encompass what types of calls the agent should be connected to when the agent becomes available to be connected to a call. Such types of calls may include calls from a particular queue of an ACD or calls from a particular customer. In particular embodiments, such as when the workflow is loaded onto disk by a system manager, the workflow may comprise desired behavior for a group of agents.

At step 102, a request for connection with an agent is received at a network component. For example, the request may be received from a user of endpoint 32a. The user may be, for example, a caller, a sender of an e-mail or a requester of web interaction. The network component receiving the request may be an ACD, for example ACD 34a, or other network component operable to receive and distribute requests.

At step 104 a notification that an agent is available to be connected with a user is received. An agent may become available after concluding an existing call or task. An agent may also become available after taking a break. The notification may be received at a network component, such as processor 46 of ACD 34a, and may be received, for example, from the particular agent becoming available, a system manager or a network component, such as observer 49 of ACD 34a.

Step 106 includes monitoring system conditions. The system conditions may be monitored by an observer, such as observer 49 of ACD 34a. The types of system conditions monitored may include, among other conditions, the number and types of requests for connection with an agent received, the number of requests currently residing in one or more queues of an ACD, the amount of time particular requests have been waiting to be connected with an agent, the current time of day or day of week, or other conditions related to agent or user behavior.

Other types of monitored system conditions may include the type of user making a request for connection with an agent or any other information concerning such user, such as preferences of the user. In one embodiment, a network component may prompt the user to identify the business type, language or other preference of the user. In other embodiments, the user may be prompted to enter a user identification, account number, or other appropriate identifier. In still another embodiment, an interactive voice response (IVR) system may be incorporated into ACD 34a, or another network component of system 30, which provides the customer with a menu of selections for inputting customer information or preferences.

At step 108 the workflow relating to an agent received at step 100 is executed after the notification that the agent is available is received. Such execution may be made by a processor, such as processor 46 of ACD 34a.

At step 110 a request for connection with an agent is selected based on the desired behavior of the first agent (included in the executed workflow) and the monitored system information. As an example, the desired behavior for a particular agent may include connecting the agent to a request from a particular queue, for example queue 54a, and if no requests exist in queue 54a then connecting the agent to a high level customer from another queue, for example queue 54b. This information would be included in the received workflow. When the agent becomes available, system information will be monitored and the workflow will be executed. Such monitored system information may include the fact that no requests currently exist in queue 54a and may determine a request from a high level customer existing in queue 54b. Thus, based on the desired behavior and the monitored system information, the request from a high level customer existing in queue 54b will be selected. At step 112 the agent is connected with the request selected at step 110.

Although the present invention has been described in detail, various changes and modifications may be suggested to one skilled in the art. It is intended that the present invention encompass such changes and modifications as falling within the scope of the appended claims.

What is claimed is:

1. A method for routing calls of an automatic call distributor system, comprising:
  receiving a plurality of agent specific workflows, each
    agent specific workflow associated with a different respective agent of a plurality of agents and configured to be executed independent of the other agent specific workflows, each agent specific workflow comprising logic customized for its respective agent;

receiving a plurality of requests for connection with one of the plurality of agents, wherein each request is received from a respective user;

placing one or more of the requests in one or more queues;

monitoring system information;

receiving an indication that a first agent of the plurality of agents is available to handle a request;

executing a first agent specific workflow of the plurality of agent specific workflows, the first agent specific workflow associated with the first agent and comprising logic customized for the first agent that is only executed after the first agent becomes available for connection with one of the respective users, wherein the first agent specific workflow determines a desired first behavior for only the first agent associated with the first agent specific workflow based on the monitored system information;

selecting, based on the determination of the desired first behavior for the first agent, a first request of the plurality of requests;

connecting the first request to the first agent;

after the first agent has handled the first request and is available to handle another request, reexecuting the first agent specific workflow comprising logic customized for the first agent to determine a desired second behavior for the first agent based on the monitored system information;

selecting, based on the determination of the desired second behavior for the first agent, a second request of the plurality of requests; and connecting the second request to the first agent.

2. The method of claim 1, further comprising receiving a notification that the first agent is available for connection with one of the respective users, and wherein executing the first agent specific workflow after the first agent becomes available for connection with one of the respective users comprises executing the first agent specific workflow after the notification that the first agent is available for connection with one of the respective users is received.

3. The method of claim 1, wherein the first agent specific workflow is received after the first agent becomes available for connection with one of the respective users.

4. The method of claim 1, wherein the one or more queues are not associated with any specific agent.

5. The method of claim 1, wherein monitoring system information comprises monitoring a characteristic of at least one of the received requests for connection.

6. The method of claim 1, wherein monitoring system information comprises monitoring a preference of at least one of the respective users.

7. The method of claim 1, further comprising:
receiving an indication that a second agent of the plurality of agents is available to handle a second request;
executing a second agent specific workflow of the plurality of agent specific workflows, the second agent specific workflow associated with the second agent and comprising logic customized for the first agent that is only executed after the second agent becomes available for connection with one of the respective users wherein the second agent specific workflow determines a desired behavior for only the second agent associated with the second agent specific workflow based on the monitored system information;
selecting, based on the determination of the desired behavior for the second agent, a second request of the plurality of requests; and
connecting the second request to the second agent.

8. The method of claim 1, wherein the desired behavior for the first agent comprises the first agent handling only requests from users of a first priority level.

9. The method of claim 1, wherein the desired behavior for the first agent is dependent on a time of day in which the first agent is working.

10. The method of claim 1, wherein the desired behavior for the first agent is dependent on a day of the week on which the first agent is working.

11. The method of claim 1:
wherein the desired behavior of the first agent specific workflow for the first agent comprises the first agent initially handling requests of a first priority level and is dependent on the ability of the first agent to handle requests;
wherein selecting the first request based on the desired behavior of the first agent comprises selecting a first request of the first priority level; and
further comprising, after the first agent has handled the first request:
reexecuting the first agent specific workflow; and
selecting, according to the first agent specific workflow, a second request of a second priority level for connection with the first agent based on the handling of the first request by the first agent.

12. An automatic call distributor system, comprising:
a memory operable to receive a plurality of agent specific workflows, each agent specific workflow associated with a different respective agent of a plurality of agents and configured to be executed independent of the other agent specific workflows, each agent specific workflow comprising logic customized for its respective agent;
a plurality of input ports, each input port operable to receive a request for connection with one of the plurality of agents, wherein each request is received from a respective user;
one or more queues configured to receive one or more of the requests;
an observer operable to monitor system information and to receive an indication that a first agent of the plurality of agents is available to handle a request;
a processor operable to execute a first agent specific workflow of the plurality of agent specific workflows, the first agent specific workflow associated with the first agent and comprising logic customized for the first agent that is only executed after the first agent becomes available for connection with one of the respective users, wherein the first agent specific workflow determines a desired first behavior for only the first agent associated with the first agent specific workflow based on the monitored system information;
the processor being further operable to select, based on the determination of the desired first behavior for the first agent, a first request of the plurality of requests;
a distributor operable to connect the first request to the first agent;
the processor being further operable to:
after the first agent has handled the first request and is available to handle another request, reexecute the first agent specific workflow comprising logic customized for the first agent to determine a desired second behavior for the first agent based on the monitored system information; and select, based on the determination of the desired second behavior for the first agent, a second request of the plurality of requests; and wherein the distributor is further operable to connect the second request to the first agent.

13. The system of claim 12, wherein the processor is further operable to receive a notification that the first agent is available for connection with one of the respective users, and wherein the processor being further operable to execute the first agent specific workflow after the first agent becomes available for connection with one of the respective users comprises the processor being further operable to execute the first agent specific workflow after the notification that the first agent is available for connection with one of the respective users is received by the processor.

14. The system of claim 12, wherein the memory is operable to receive the first agent specific workflow after the first agent becomes available for connection with one of the respective users.

15. The system of claim 12, wherein the one or more queues are not associated with any specific agent.

16. The system of claim 12, wherein an observer operable to monitor system information comprises an observer operable to monitor a characteristic of at least one of the received requests for connection.

17. The system of claim 12, wherein an observer operable to monitor system information comprises an observer operable to monitor a preference of at least one of the respective users.

18. The system of claim 12, wherein:
the processor is further operable to:
receive an indication that a second agent of the plurality of agents is available to handle a second request;
execute a second agent specific workflow of the plurality of agent specific workflows, the second agent specific workflow associated with the second agent and comprising logic customized for the first agent that is only executed after the second agent becomes available for connection with one of the respective users wherein the second agent specific workflow determines a desired behavior for only the second agent associated with the second agent specific workflow based on the monitored system information; and
select, based on the determination of the desired behavior for the second agent, a second request of the plurality of requests a second request of the plurality of requests, wherein the second request is selected based on the desired behavior of the second agent and the monitored system information; and
the distributor is further operable to connect the second request to the second agent.

19. Logic encoded in media for routing calls of an automatic call distributor system, the logic operable to perform the following steps:
receive a plurality of agent specific workflows, each agent specific workflow associated with a different respective agent of a plurality of agents and configured to be executed independent of the other agent specific workflows, each agent specific workflow comprising logic customized for its respective agent;
receive a plurality of requests for connection with one of the plurality of agents, wherein each request is received from a respective user;
place one or more of the requests in one or more queues;
monitor system information;
receive an indication that a first agent of the plurality of agents is available to handle a request;
execute a first agent specific workflow of the plurality of agent specific workflows, the first agent specific workflow associated with the first agent and comprising logic customized for the first agent that is only executed after the first agent becomes available for connection with one of the respective users, wherein the first agent specific workflow determines a desired first behavior for only the first agent associated with the first agent specific workflow based on the monitored system information;
select, based on the determination of the desired first behavior for the first agent, a first request of the plurality of requests;
connect the first request to the first agent;
after the first agent has handled the first request and is available to handle another request, reexecute the first agent specific workflow comprising logic customized for the first agent to determine a desired second behavior for the first agent based on the monitored system information;
select, based on the determination of the desired second behavior for the first agent, a second request of the plurality of requests; and
connect the second request to the first agent.

20. The logic encoded in media of claim 19, wherein the logic is further operable to receive a notification that the first agent is available for connection with one of the respective users, and wherein the step of executing the first agent specific workflow after the first agent becomes available for connection with one of the respective users comprises executing the first agent specific workflow after the notification that the first agent is available for connection with one of the respective users is received.

21. The logic encoded in media of claim 19, wherein the first agent specific workflow is received after the first agent becomes available for connection with one of the respective users.

22. The logic encoded in media of claim 19, wherein the one or more queues are not associated with any specific agent.

23. The logic encoded in media of claim 19, wherein the system information comprises a characteristic of at least one of the received requests for connection.

24. The logic encoded in media of claim 19, wherein the system information comprises a preference of at least one of the respective users.

25. The logic encoded in media of claim 19, wherein the logic is further operable to:
receive an indication that a second agent of the plurality of agents is available to handle a second request;
execute a second agent specific workflow of the plurality of agent specific workflows, the second agent specific workflow associated with the second agent and comprising logic customized for the first agent that is only executed after the second agent becomes available for connection with one of the respective users wherein the second agent specific workflow determines a desired behavior for only the second agent associated with the second agent specific workflow based on the monitored system information;
select, based on the determination of the desired behavior for the second agent, a second request of the plurality of requests; and
connect the second request to the second agent.

26. An apparatus for routing calls of an automatic call distributor system, comprising:
means for receiving a plurality of agent specific workflows, each agent specific workflow associated with a different respective agent of a plurality of agents and configured to be executed independent of the other agent specific workflows, each agent specific workflow comprising logic customized for its respective agent;

means for receiving a plurality of requests for connection with one of the plurality of agents, wherein each request is received from a respective user;

means for placing one or more of the requests in one or more queues;

means for monitoring system information;

means for receiving an indication that a first agent of the plurality of agents is available to handle a request;

means for executing a first agent specific workflow of the plurality of agent specific workflows, the first agent specific workflow associated with the first agent and comprising logic customized for the first agent that is only executed after the first agent becomes available for connection with one of the respective users, wherein the first agent specific workflow determines a desired first behavior for only the first agent associated with the first agent specific workflow based on the monitored system information;

means for selecting, based on the determination of the desired first behavior for the first agent, a first request of the plurality of requests;

means for connecting the first request to the first agent;

means for, after the first agent has handled the first request and is available to handle another request, reexecuting the first agent specific workflow comprising logic customized for the first agent to determine a desired second behavior for the first agent based on the monitored system information;

means for selecting, based on the determination of the desired second behavior for the first agent, a second request of the plurality of requests; and means for connecting the second request to the first agent.

27. The apparatus of claim 26, further comprising means for receiving a notification that the first agent is available for connection with one of the respective users, and wherein means for executing the first agent specific workflow after the first agent becomes available for connection with one of the respective users comprises means for executing the first agent specific workflow after the notification that the first agent is available for connection with one of the respective users is received.

28. The apparatus of claim 26, wherein the first agent specific workflow is received after the first agent becomes available for connection with one of the respective users.

29. The apparatus of claim 26, wherein the one or more queues are not associated with any specific agent.

30. The apparatus of claim 26, wherein means for monitoring system information comprises means for monitoring a characteristic of at least one of the received requests for connection.

31. The apparatus of claim 26, wherein means for monitoring system information comprises means for monitoring a preference of at least one of the respective users.

32. The apparatus of claim 26, further comprising:

means for receiving an indication that a second agent of the plurality of agents is available to handle a second request;

means for executing a second agent specific workflow of the plurality of agent specific workflows, the second agent specific workflow associated with the second agent and comprising logic customized for the first agent that is only executed after the second agent becomes available for connection with one of the respective users wherein the second agent specific workflow determines a desired behavior for only the second agent associated with the second agent specific workflow based on the monitored system information;

means for selecting, based on the determination of the desired behavior for the second agent, a second request of the plurality of requests; and means for connecting the second request to the second agent.

33. A method for routing calls of an automatic call distributor system, comprising:

receiving a plurality of agent specific workflows, each agent specific workflow associated with a different respective agent of a plurality of agents and configured to be executed independent of the other agent specific workflows, each agent specific workflow comprising logic customized for its respective agent;

receiving a plurality of requests for connection with one of the plurality of agents, wherein each request is received from a respective user;

placing one or more of the requests in one or more queues, none of the one or more queues associated with any specific agent of the plurality of agents;

monitoring system information;

each time an agent becomes available for connection with one of the users to handle the respective request of a user, executing an agent specific workflow associated with the available agent to determine a desired behavior for the available agent based on the monitored system information, wherein each of the plurality of agent specific workflows are only executed upon its respective agent becoming available for connection with one of the users to handle the respective request of a user;

selecting a request of the plurality of requests based on the determined desired behavior for the available agent and the monitored system information; and connecting the request to the available agent, the available agent becoming unavailable at least while handling the request.

* * * * *

UNITED STATES PATENT AND TRADEMARK OFFICE
CERTIFICATE OF CORRECTION

| | |
|---|---|
| PATENT NO. | : 7,657,263 B1 |
| APPLICATION NO. | : 10/104564 |
| DATED | : February 2, 2010 |
| INVENTOR(S) | : Chahrouri et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 987 days.

Signed and Sealed this

Thirtieth Day of November, 2010

David J. Kappos
*Director of the United States Patent and Trademark Office*